United States Patent
Sandoval

(10) Patent No.: US 8,340,276 B1
(45) Date of Patent: Dec. 25, 2012

(54) SYSTEM AND METHOD FOR PROVIDING CUSTOMER SERVICE

(75) Inventor: Christopher Andrew Sandoval, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1226 days.

(21) Appl. No.: 11/742,093

(22) Filed: Apr. 30, 2007

(51) Int. Cl.
*H04M 3/00* (2006.01)
*H04M 5/00* (2006.01)

(52) U.S. Cl. ............ 379/265.11; 379/265.1; 379/265.02; 379/265.09

(58) Field of Classification Search ............ 379/265.02, 379/210.01, 266.01, 265.11, 265.01, 265.05, 379/265.09, 265.1; 705/9

See application file for complete search history.

(56) References Cited

U.S. PATENT DOCUMENTS

| | | | |
|---|---|---|---|
| 5,615,121 A * | 3/1997 | Babayev et al. | 705/9 |
| 5,978,463 A | 11/1999 | Jurkevics et al. | |
| 6,574,605 B1 | 6/2003 | Saunders et al. | |
| 6,859,529 B2 | 2/2005 | Duncan et al. | |
| 6,956,941 B1 | 10/2005 | Duncan et al. | |
| 2007/0036320 A1 * | 2/2007 | Mandalia et al. | 379/210.01 |
| 2008/0037764 A1 * | 2/2008 | Lee et al. | 379/266.01 |

\* cited by examiner

*Primary Examiner* — Thjuan K Addy
(74) *Attorney, Agent, or Firm* — Brooks, Cameron & Huebsch, PLLC

(57) ABSTRACT

Various systems and methods provide techniques for providing a communication center comprising a plurality of representatives, receiving a request for communication from a first party, determining an available representative from the plurality of representatives and a representative available time period for the request for communication, preventing the available representative from communicating with a second party during the representative available time period, providing the first party with communication information, and connecting the first party to the available representative during the representative available time period.

19 Claims, 14 Drawing Sheets

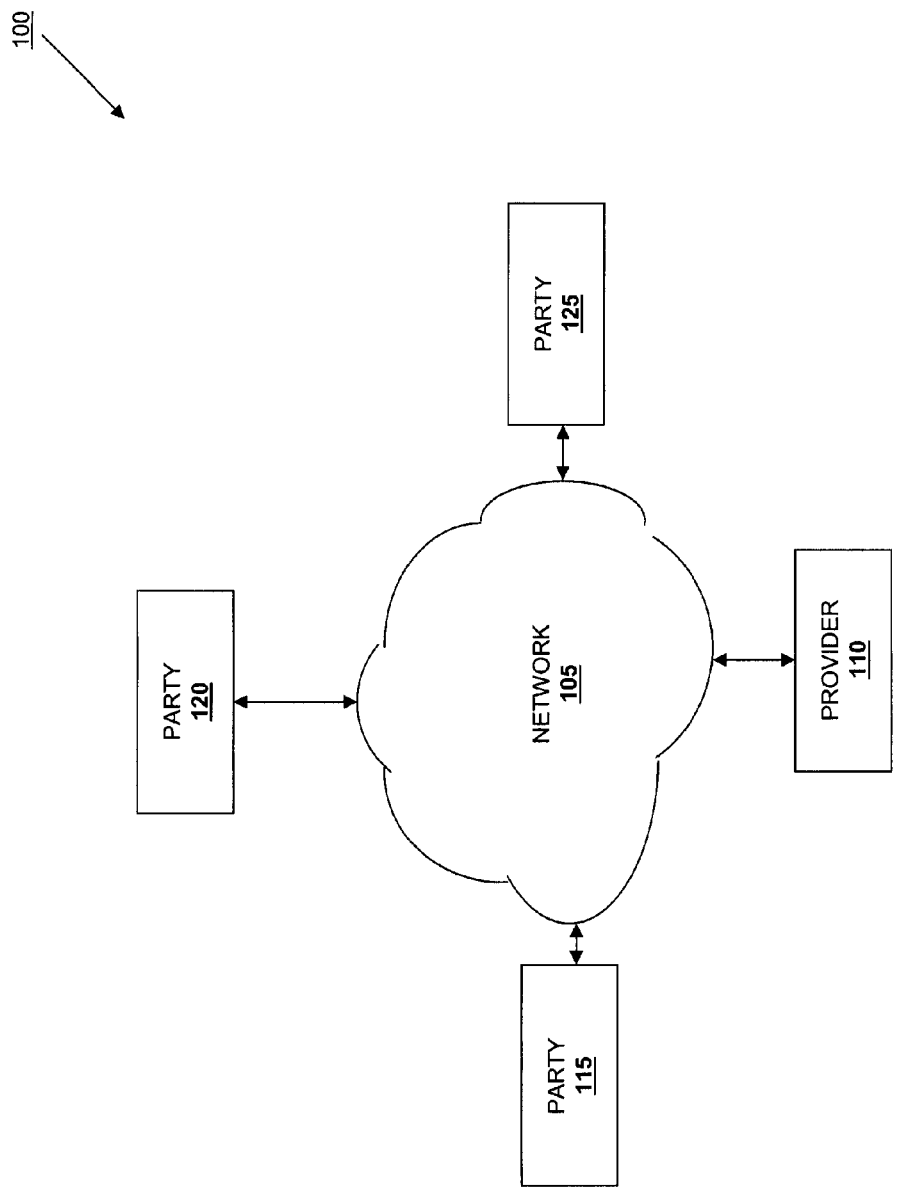

SYSTEM AND METHOD FOR PROVIDING CUSTOMER SERVICE

FIELD OF THE DISCLOSURE

Various embodiments of the disclosure pertain to a system and method for providing customer service.

BACKGROUND

Providing customer service is well-known and readily appreciated by those of skill in the art. In the area of customer service phone calls, a provider may offer a plurality of different products and/or services, and a party or customer may have questions about those products and/or service. For example, the party or customer may want to purchase a product and/or service, and may have questions about those products or services that they want answered before they purchase. In another example, the party and/or customer may have purchased a product and/or service, and may be looking for support from the provider related to those products and/or services. The provider will typically provide the party or customer a way to communicate with the provider to answer any questions and provide any support that the party or customer needs. The providing of such communication raises a number of issues.

Conventionally, the provider will provide a phone number for the party or customer to call in order to provide answers to questions or to provide support. Often, this number connects the party or customer to an automated system that is used to determine the correct representative to route the call to. As the provider offers more and more products and/or service across more and more business lines, navigating through these automated systems can become difficult for the party or customer. Furthermore, the party or customer will often want to speak with a human being rather than the automated system. When the party or customer has navigated far enough through the automated system they may be put on hold until the next available representative is available to speak with them, which is often a significant amount of time, resulting in an unsatisfying party or customer experience. Even when the phone number bypasses any automated systems, there is still often a significant wait time for the party or customer to speak with a representative. Also, the party or customer may spend significant time searching for the correct phone number to call to speak with the correct representative, particularly when the provider offers many products and/or services across many business lines.

Accordingly, it would be desirable to provide an improved system and method for providing customer service.

SUMMARY

Various embodiments of the present disclosure are directed to systems and methods for providing customer service. The systems and methods provide techniques for providing a communication center comprising a plurality of representatives, receiving a request for communication from a first party, determining an available representative from the plurality of representatives and a representative available time period for the request for communication, preventing the available representative from communicating with a second party during the representative available time period, providing the first party with communication information, and connecting the first party to the available representative during the representative available time period.

BRIEF DESCRIPTION OF THE DRAWINGS

FIG. 1a is a schematic view illustrating an embodiment of a system for providing customer service.

FIG. 1b is a schematic view illustrating an embodiment of an information handling system used with the system for providing customer service of FIG. 1a.

FIG. 1c is a schematic view illustrating an embodiment of a provider used in the system for providing customer service of FIG. 1a.

DETAILED DESCRIPTION

Figure 1B:
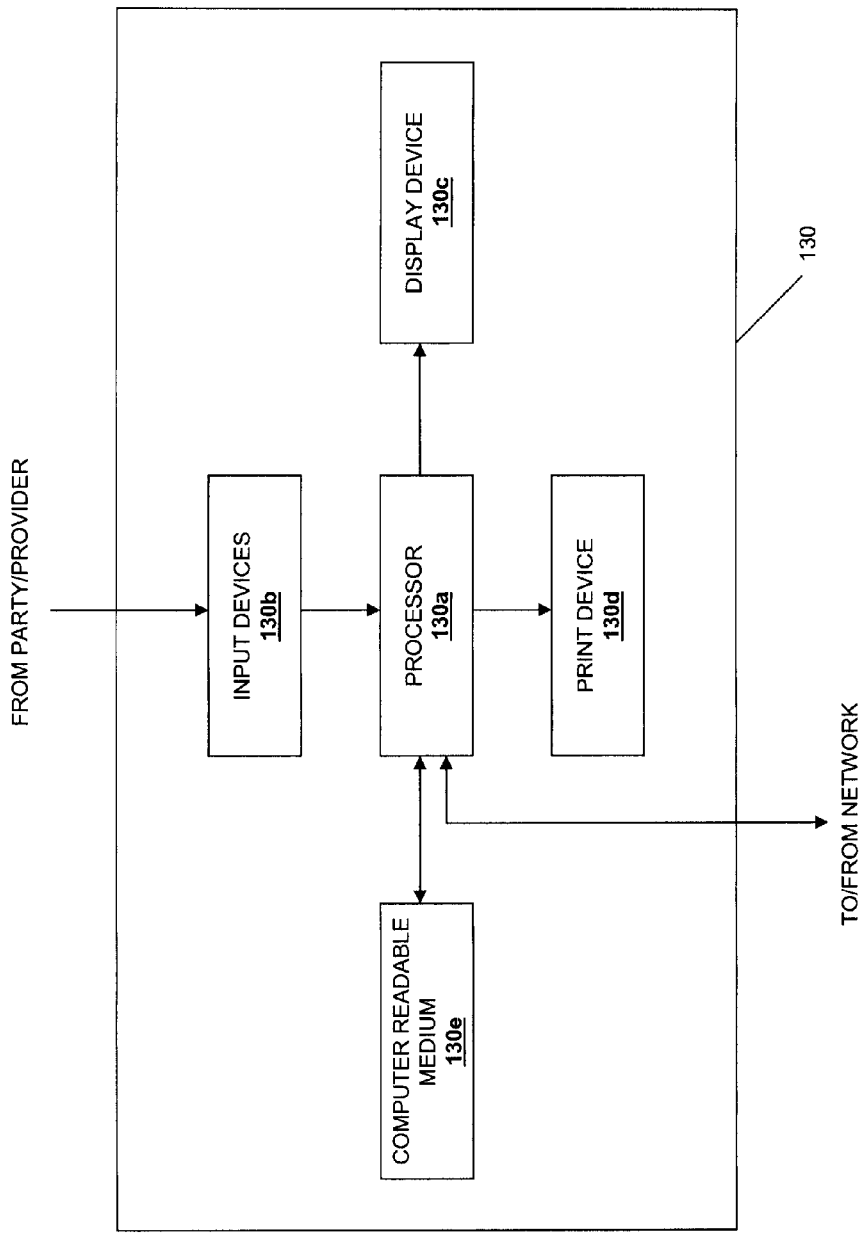

Referring now to FIG. 1a, in one embodiment, a system for providing customer service 100 is illustrated. The system 100 includes a computer network 105 such as, for example, a Transport Control Protocol/Internet Protocol (TCP/IP) network (e.g., the internet or an intranet). A provider 110 is operably coupled to the network 105. A plurality of parties 115, 120 and 125 are also operably coupled to the network 105 in order to allow communication between the parties 115, 120 and 125 and the provider 110. In an embodiment, the provider 110 includes a provider of a plurality of products and/or services across a plurality of business lines. In an embodiment, the provider 110 includes a membership organization which provides a plurality of services for its members such as, for example, banking, insurance, financial services, loan providing, and/or a variety of other services known in the art, wherein the members include parties 115, 120 and 125. In an embodiment, the provider 110 includes anyone providing a product and/or service that a party may want information or support on. In an embodiment, the provider 110 is a third party to a party and a provider where the provider provides products and/or services to the party. In an embodiment, the parties 115, 120 and 125 may be, for example, a person seeking information about a product and/or service, a person seeking support for a product and/or service, a third party seeking support for a product and/or service used by a party, and/or a variety of other relationships between a party and a product and/or service provider known in the art.

Each of the provider 110 and the parties 115, 120 and 125 includes a respective network interface for communicating with the network 105 (e.g., outputting information to, and receiving information from, the network 105), such as by transferring information (e.g., instructions, data, signals)

between such parties and the network 105. Accordingly, through the network 105, the provider 110 communicates with the parties 115, 120 and 125, and the parties 115, 120 and 125 communicate with the provider 110.

For clarity, FIG. 1a depicts only one provider 110. However, the system 100 may include a plurality of providers. Likewise, for clarity, FIG. 1a depicts only three parties 115, 120 and 125. However, the system 100 may include a plurality of parties. In the discussion below, the party 115 is a representative one of the parties 115, 120 and 125.

Each of the provider 110 and the parties 115, 120 and 125 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, all such IHSs are coupled to each other. Accordingly, the provider 110 and the parties 115, 120 and 125 operate within the network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch and other devices coupled to a network (e.g., the network 105).

Referring now to FIG. 1b, an IHS 130 which is representative of one of the IHSs described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tub (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), scanning visual images, and/or faxing visual images, (e) a computer-readable medium 130e, which is operably coupled to the processor 130a, for storing information, as discussed further below, and (f) various other electronic circuitry for performing other operations of the IHS 130 known in the art.

For example, the IHS 130 includes (a) a network interface (e.g., circuitry) for communicating between the processor 130a and the network 105 and (b) a memory device (e.g., random access memory (RAM) device or read only memory (ROM) device for storing information (e.g., instructions executed by processor 130a and data operated upon by processor 130a in response to such instructions)). Accordingly the processor 130a is operably coupled to the network 105, the input devices 130b, the display device 130c, the print device 130d, and the computer-readable medium 130e, as illustrated in FIG. 1b.

For example, in response to signals from the processor 130a, the display device 130c displays visual images. Information may be input to the processor 130a from the input devices 130b, and the processor 130a may receive such information from the input devices 130b. Also, in response to signals from the processor 130a, the print device 130d may print visual images on paper, scan visual images, and/or fax visual images.

The input devices include a variety of input devices known in the art such as, for example, a conventional electronic keyboard and a pointing device such as, for example, a conventional electronic "mouse", rollerball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor control information from the pointing device.

The computer-readable medium 130e and the processor 130a are structurally and functionally interrelated with one another as described below in further detail. Each IHS of the illustrative embodiment is structurally and functionally interrelated with a respective computer-readable medium, similar to the manner in which the processor 130a is structurally and functionally interrelated with the computer-readable medium 130e. In that regard, the computer-readable medium 130e is a representative one of such computer-readable media including, for example, but not limited to, a hard disk drive.

The computer-readable medium 130e stores (e.g., encodes, records, or embodies) functional descriptive material (e.g., including but not limited to software (also referred to as computer programs or applications) or data structures). Such functional descriptive material imparts functionality when encoded on the computer-readable medium 130e. Also, such functional descriptive material is structurally and functionally interrelated to the computer-readable medium 130e.

With such functional descriptive material, data structures define structural and functional interrelationships between such data structures and the computer-readable medium 130e (and other aspects of the system 100). Such interrelationships permit the data structures' functionality to be realized. Also, within such functional descriptive material, computer programs define structural and functional interrelationships between such computer programs and the computer-readable medium 130e (and other aspects of the system 100). Such interrelationships permit the computer programs' functionality to be realized.

For example, the processor 130a reads (e.g., accesses or copies) such functional descriptive material from the computer-readable medium 130e onto the memory device of the IHS 130, and the IHS 130 (more particularly, the processor 130a) performs its operations (as described elsewhere herein) in response to such material which is stored in the memory device of the IHS 130. More particularly, the processor 130a performs the operation of processing a computer application (that is stored, encoded, recorded, or embodied on a computer-readable medium) for causing the processor 130a to perform additional operations (as described elsewhere herein). Accordingly, such functional descriptive material exhibits a functional interrelationship with the way in which processor 130a executes its processes and performs its operations.

Further, the computer-readable medium 130e is an apparatus from which the computer application is accessible by the processor 130a, and the computer application is processable by the processor 130a for causing the processor 130a to perform such additional operations. In addition to reading such functional descriptive material from the computer-readable medium 130e, the processor 130a is capable of reading such functional descriptive material from (or through) the network 105 which is also a computer-readable medium (or apparatus). Moreover, the memory device of the IHS 130 is itself a computer-readable medium (or apparatus).

Figure 1C:
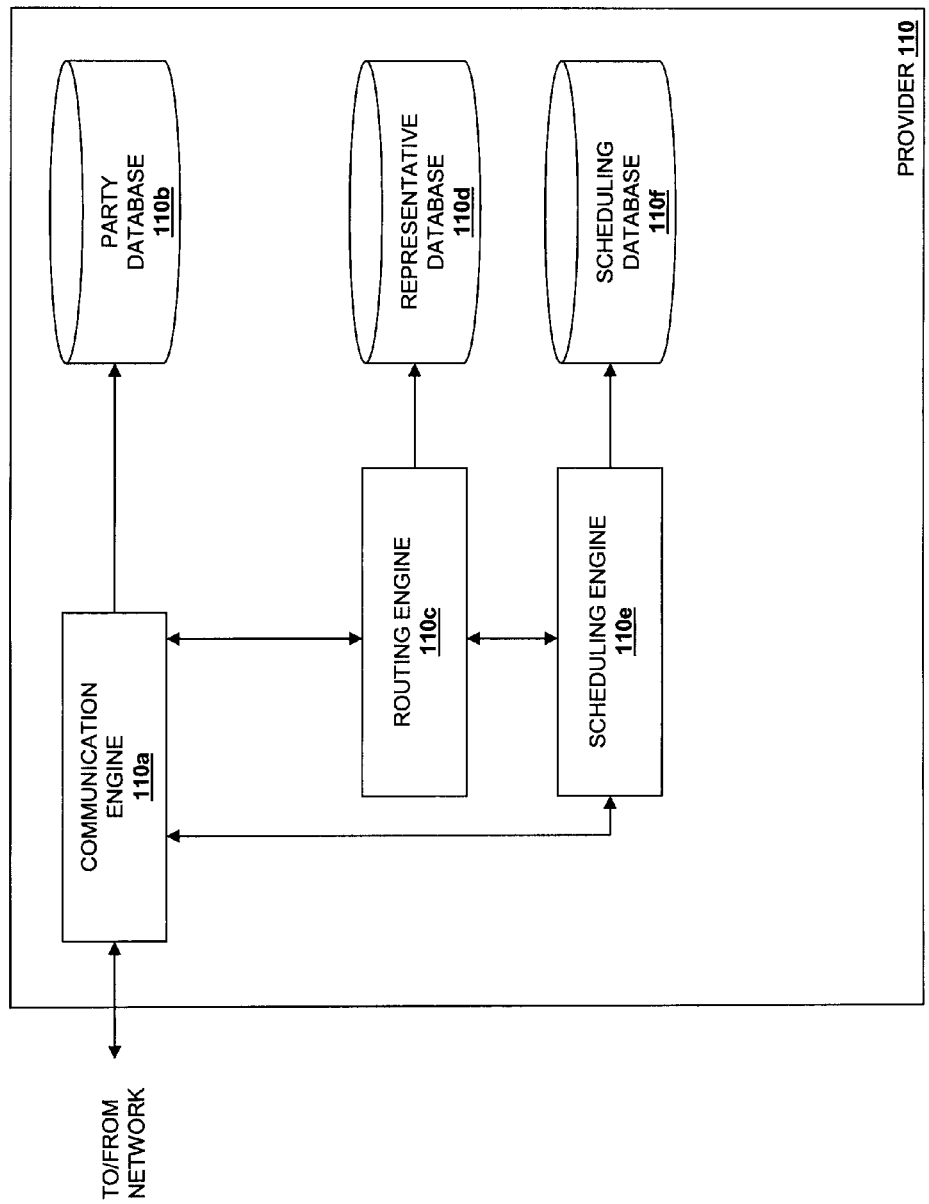
Figure 2A:
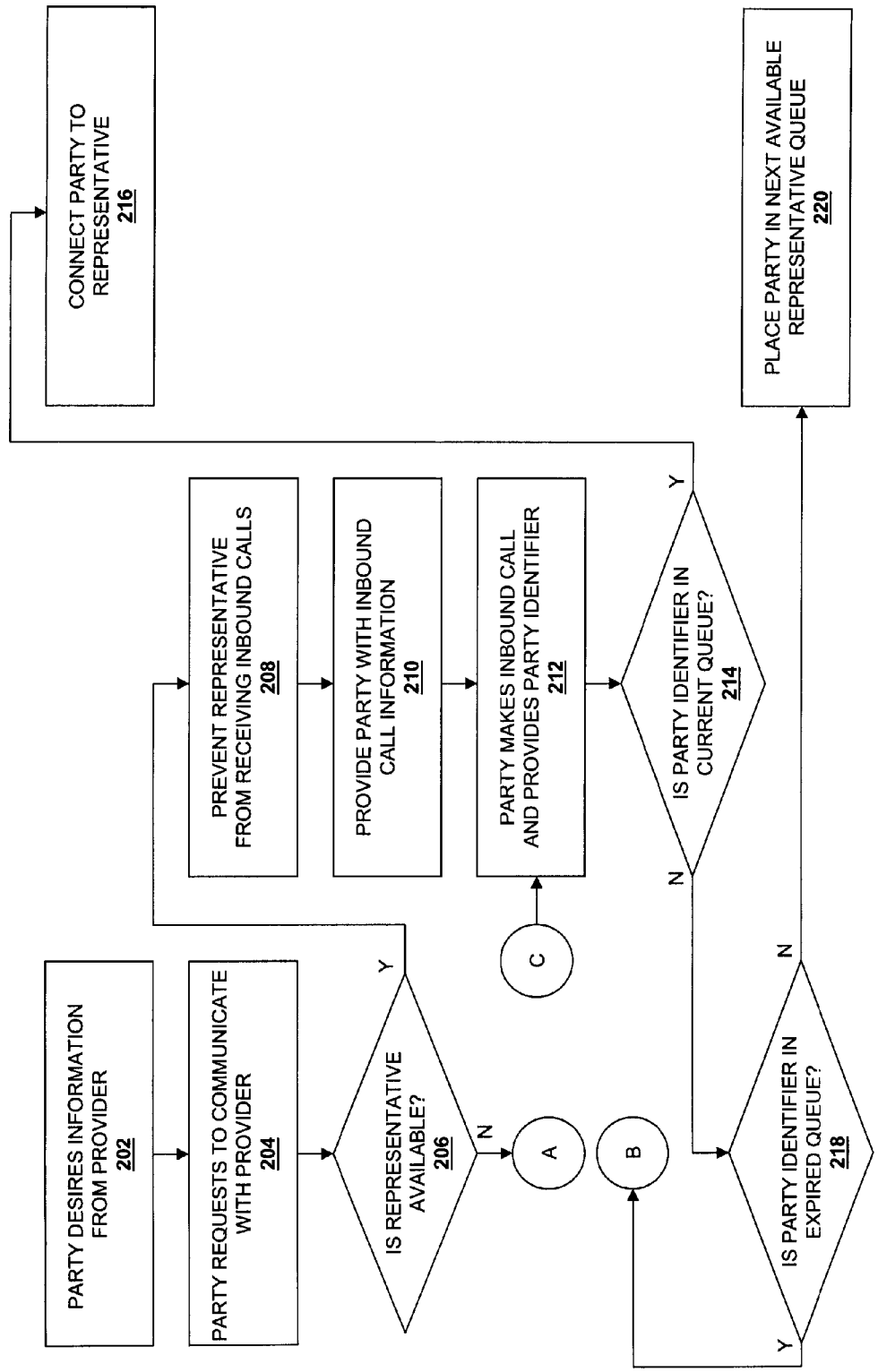
FIG. 2a is a flow chart illustrating an embodiment of a portion of a method for providing customer service.
Figure 2B:
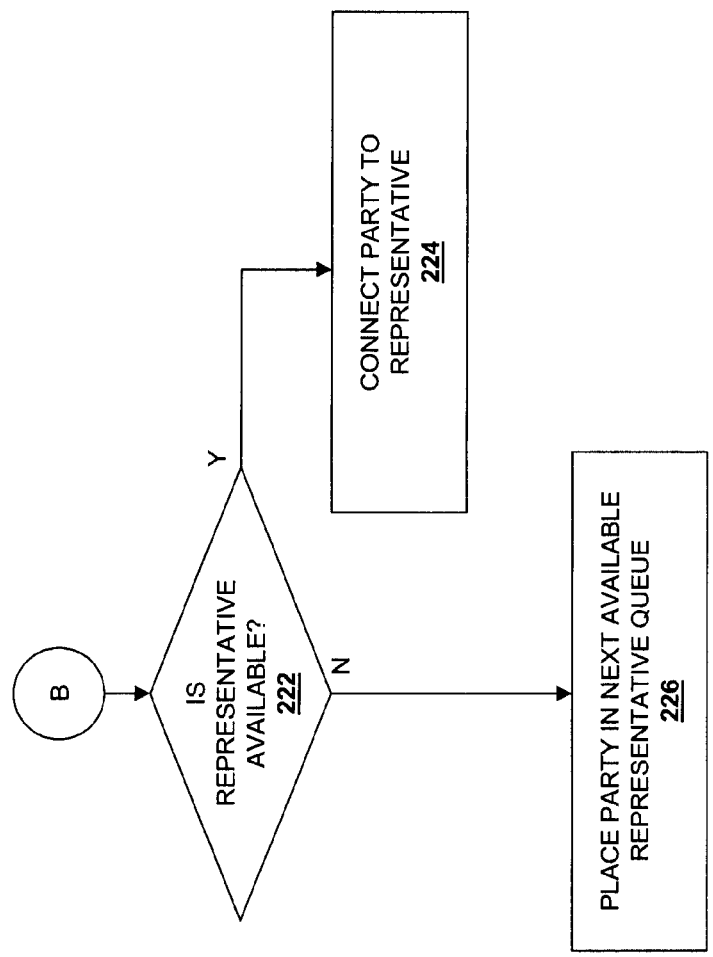
FIG. 2b is a flow chart illustrating an embodiment of a portion of a method for providing customer service.
Figure 2C:
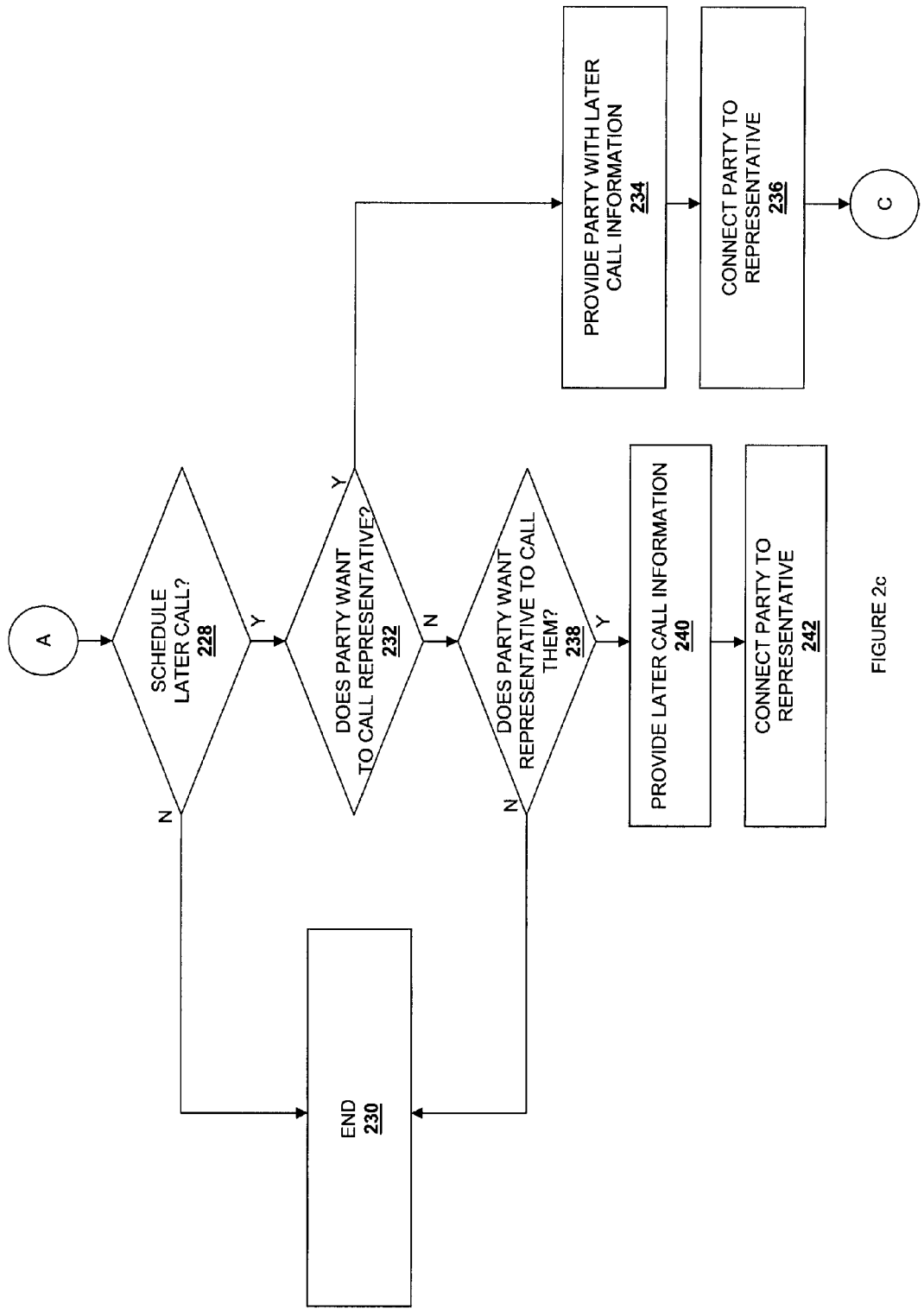
FIG. 2c is a flow chart illustrating an embodiment of a portion of a method for providing customer service.
Figure 2D:
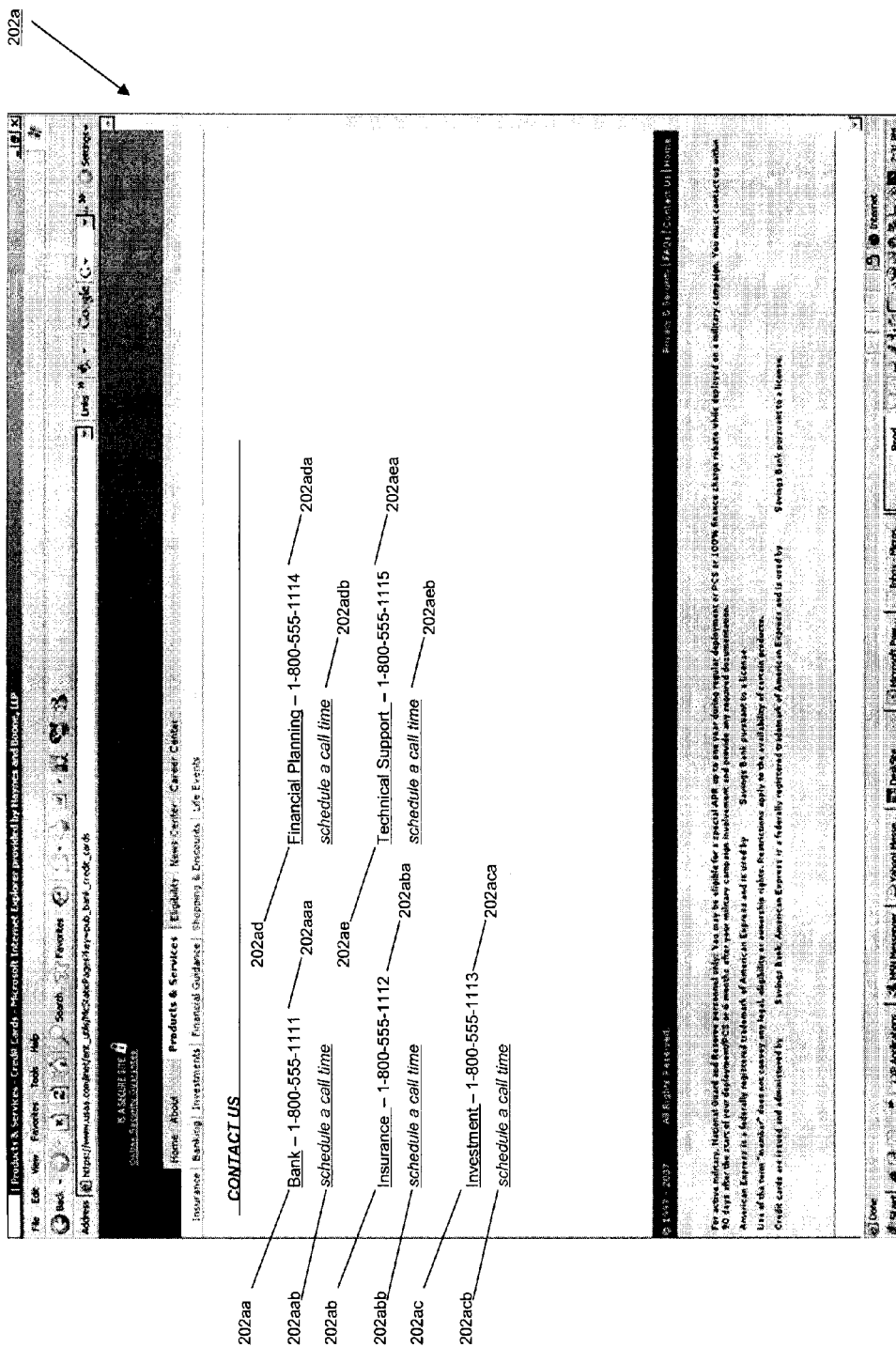
FIG. 2d is a screenshot illustrating an embodiment of a webpage used in the method of FIGS. 2a, 2b, 2c.
Figure 2E:
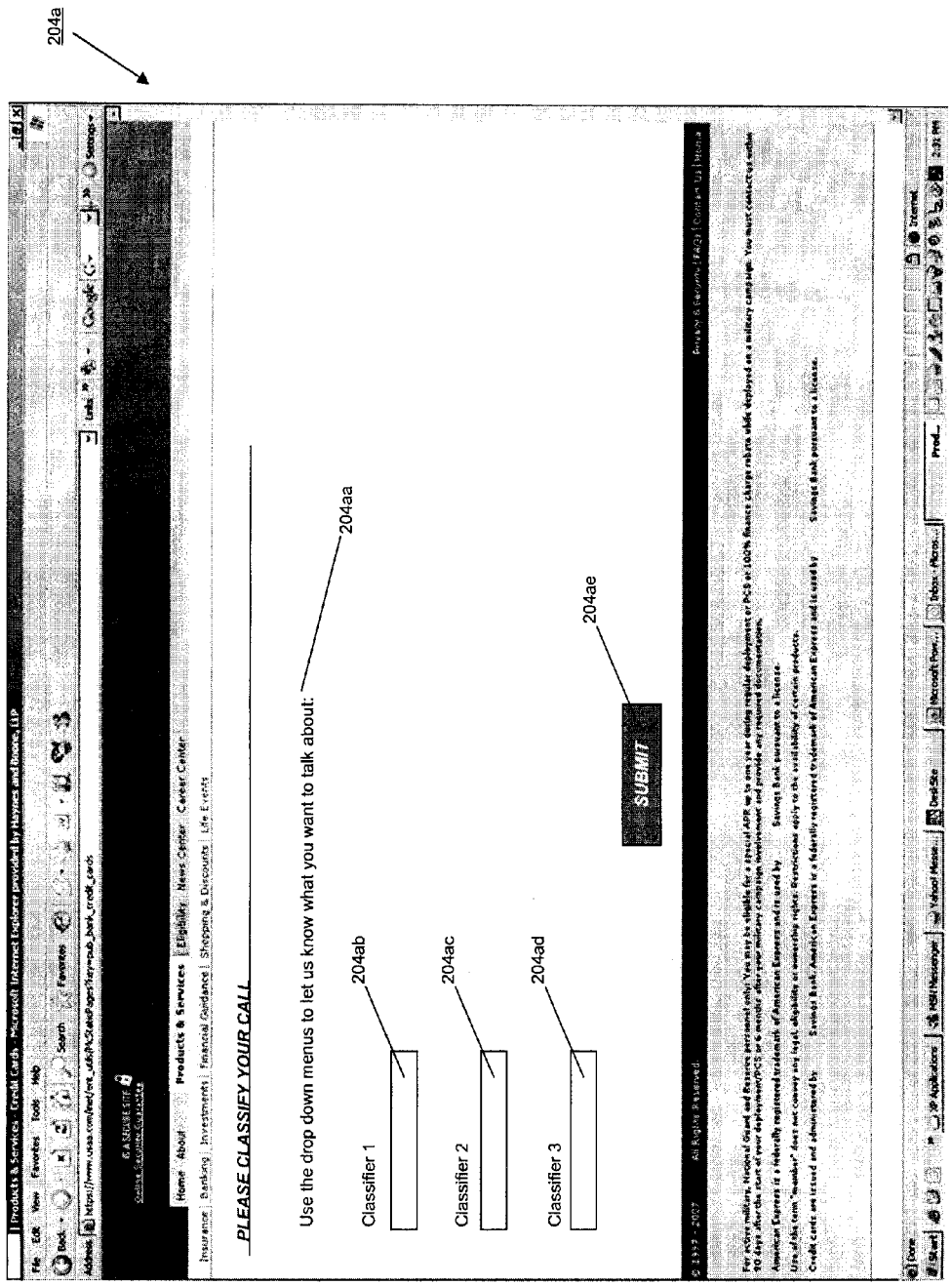
FIG. 2e is a screenshot illustrating an embodiment of a webpage used in the method of FIGS. 2a, 2b, 2c.
Figure 2F:
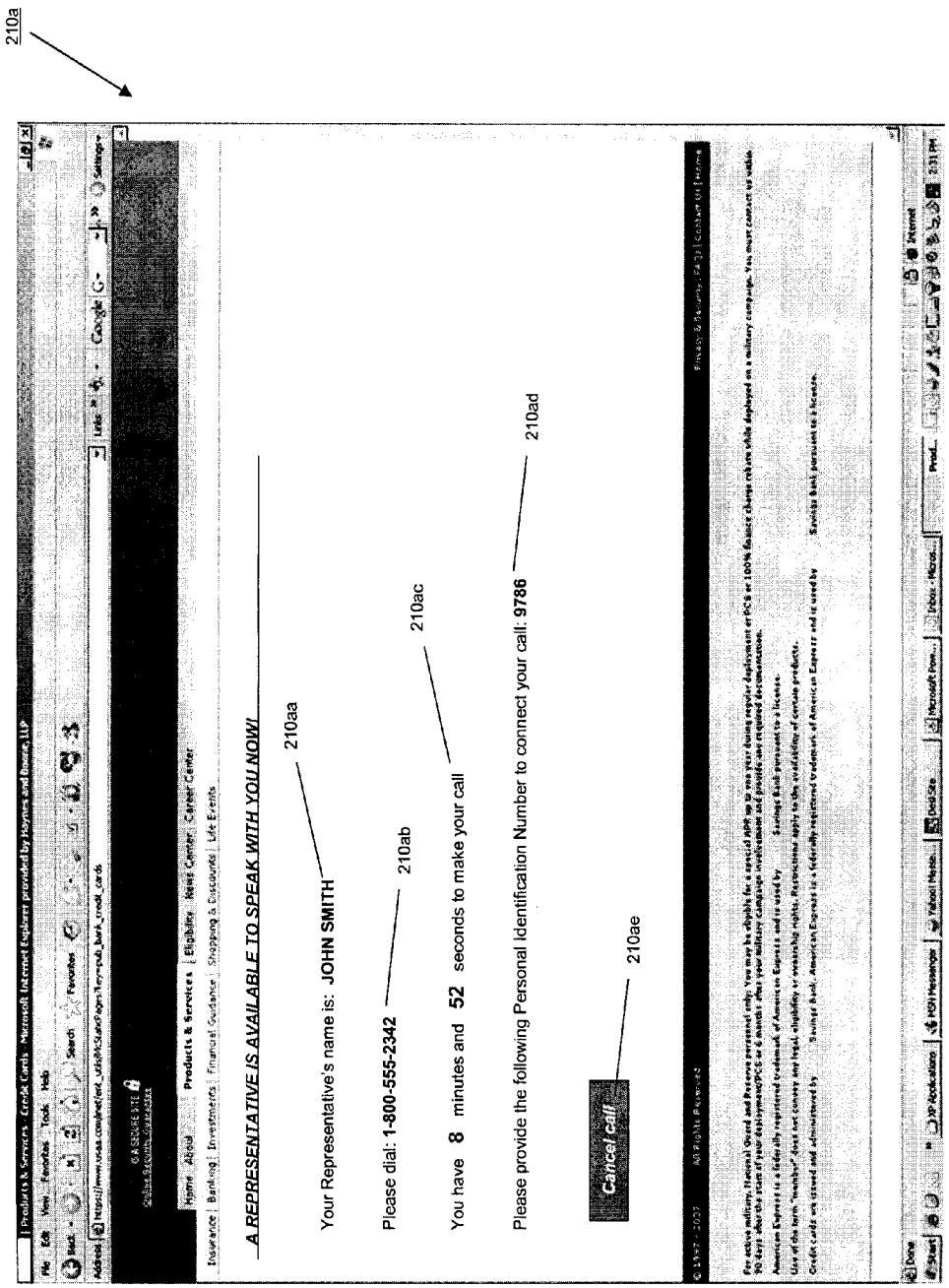
FIG. 2f is a screenshot illustrating an embodiment of a webpage used in the method of FIGS. 2a, 2b, 2c.
Figure 2G:
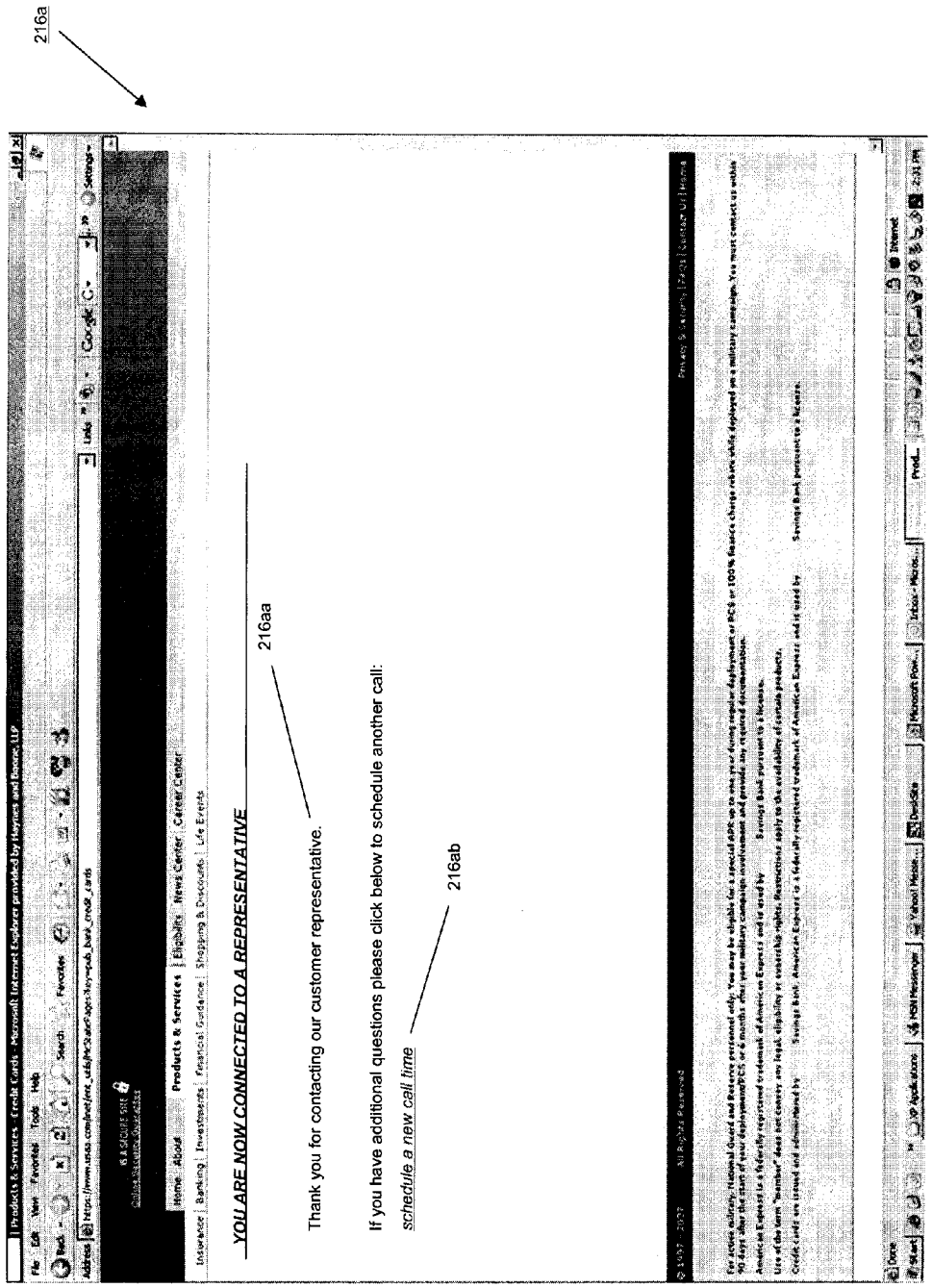
FIG. 2g is a screenshot illustrating an embodiment of a webpage used in the method of FIGS. 2a, 2b, 2c.
Figure 2H:
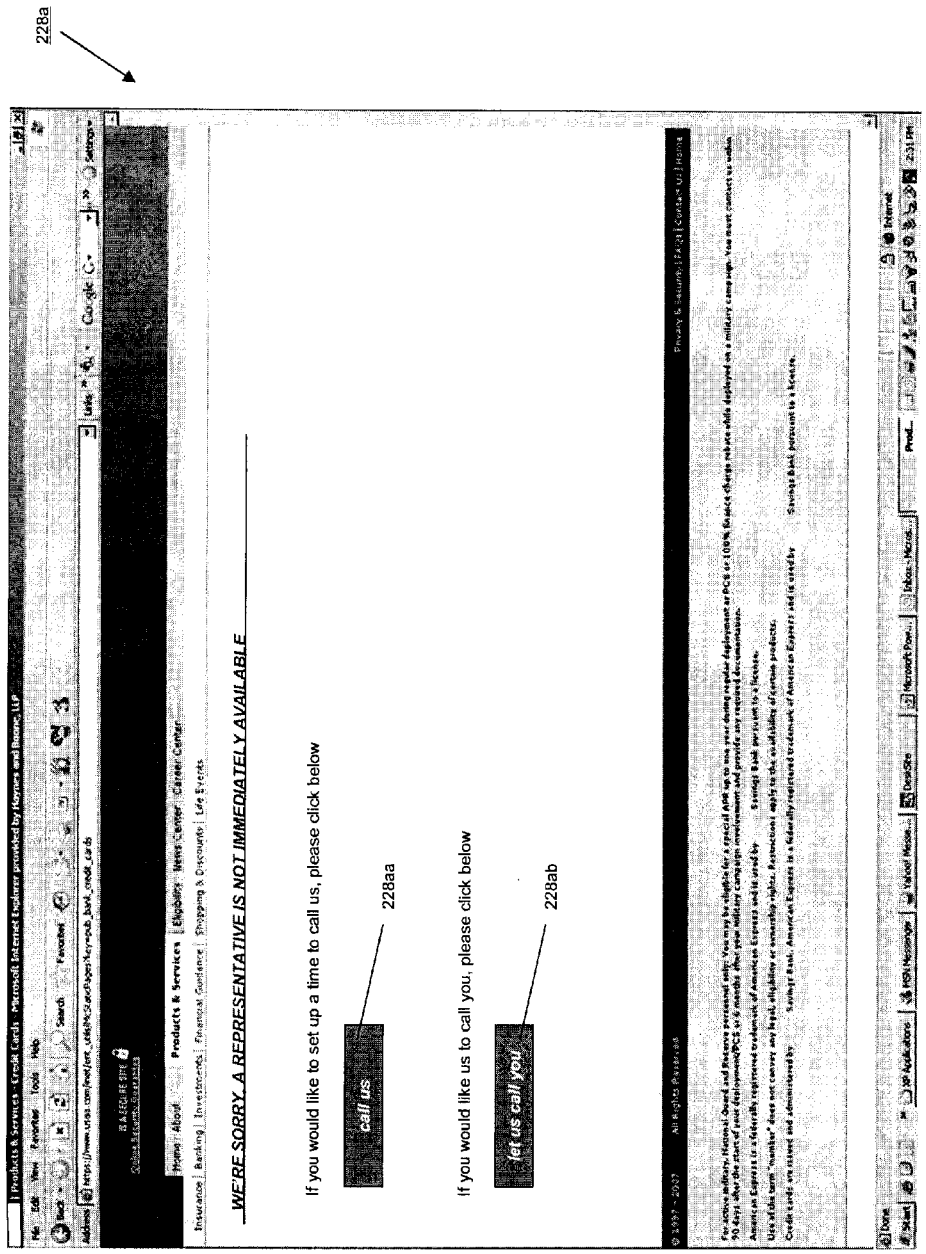
FIG. 2h is a screenshot illustrating an embodiment of a webpage used in the method of FIGS. 2a, 2b, 2c.
Figure 2I:
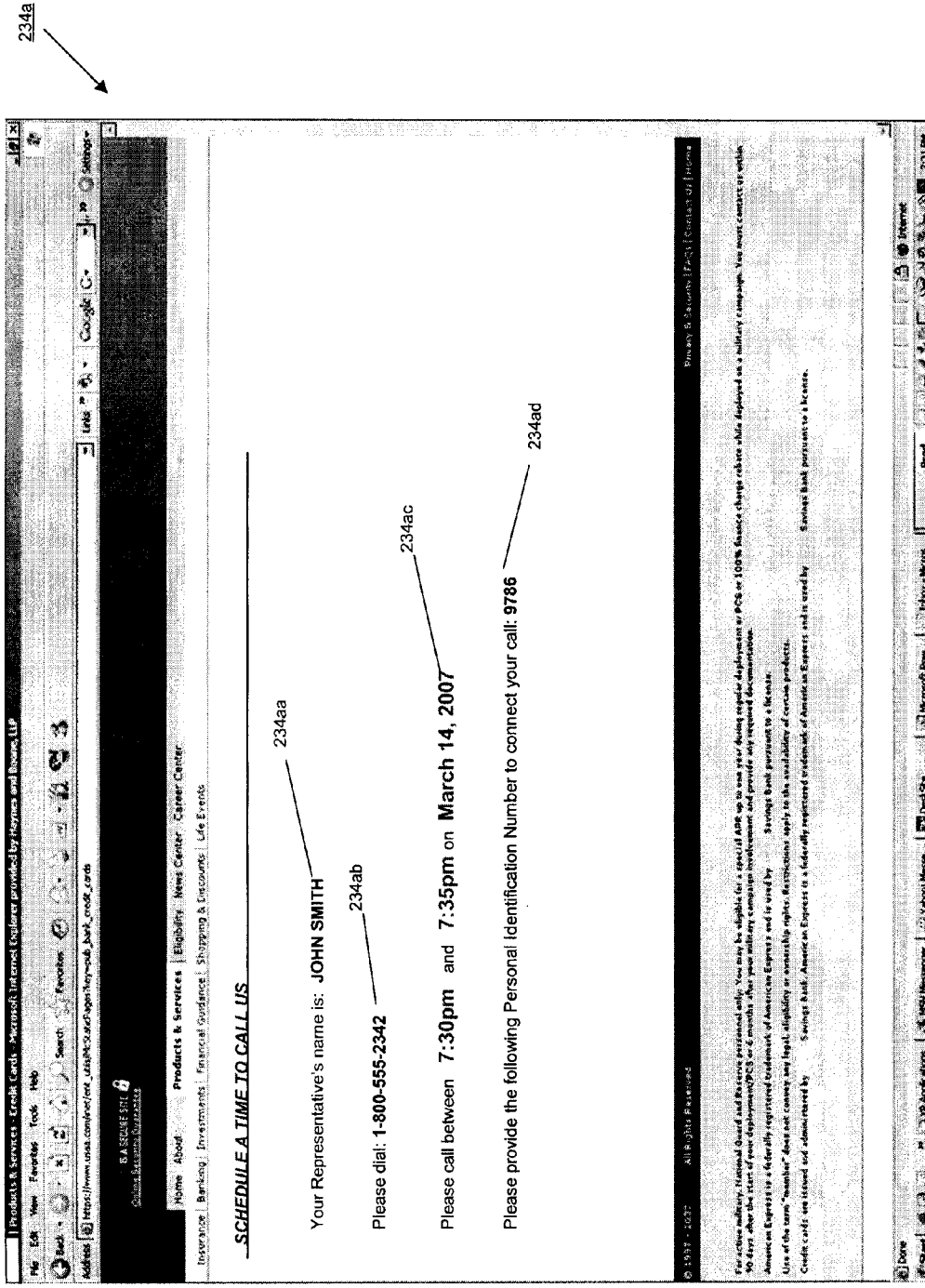
FIG. 2i is a screenshot illustrating an embodiment of a webpage used in the method of FIGS. 2a, 2b, 2c.
Figure 2J:
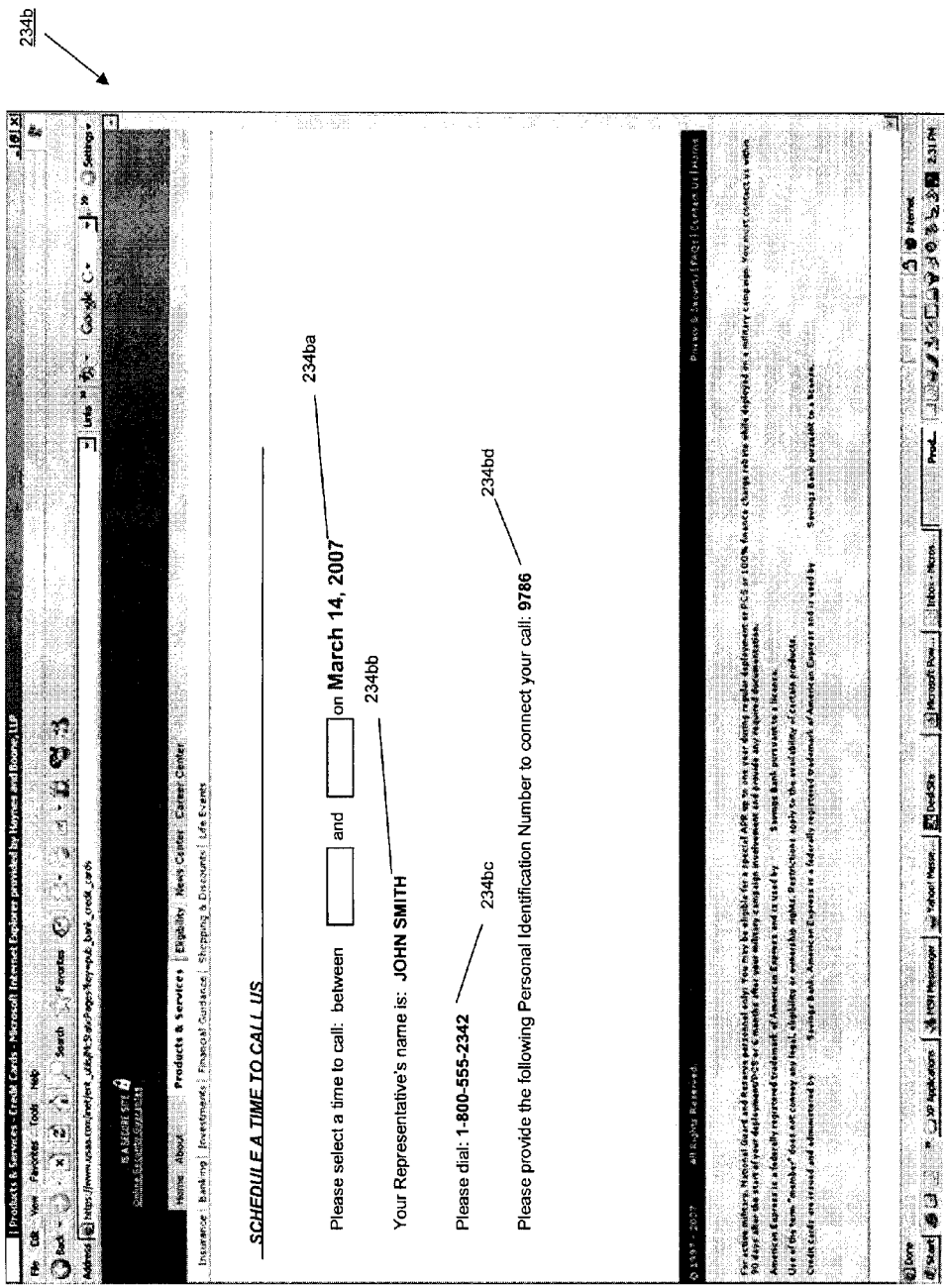
FIG. 2j is a screenshot illustrating an embodiment of a webpage used in the method of FIGS. 2a, 2b, 2c.
Figure 2K:
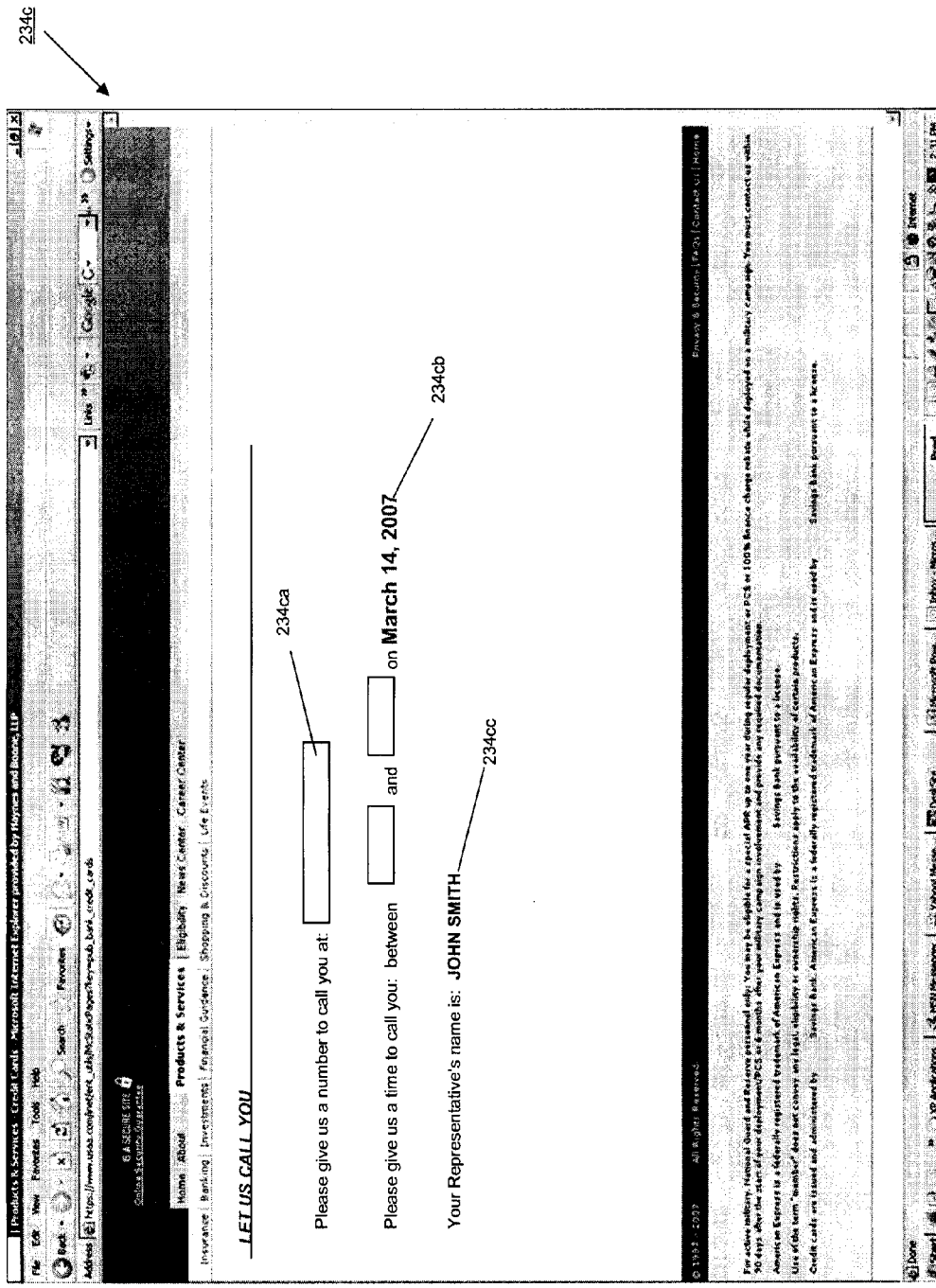
FIG. 2k is a screenshot illustrating an embodiment of a webpage used in the method of FIGS. 2a, 2b, 2c.

Referring now to FIGS. 1a, 1b and 1c, the provider 110 is illustrated in more detail. A communication engine 110a which may be, for example, software stored on the computer-readable medium 130e in the IHS 130, is included in the provider 110 and is operably coupled to the network 105, described above with reference to FIG. 1a, and to a party database 110b. A routing engine 110c which may be, for example, software stored on the computer-readable medium 130e in the IHS 130 or a representative of the provider 110, is included in the provider 110 and is operably coupled to the communication engine 110a, the network 105, described above with reference to FIG. 1a, and to a representative database 110d. A scheduling engine 110e which may be, for example, software stored on the computer-readable medium 130e in the IHS 130 or a representative of the provider 110, is included in the provider 110 and is operably coupled to the communication engine 110a, the network 105, described above with reference to FIG. 1a, to the routing engine 110c, and to a scheduling database 110f. In an embodiment, the party database 110b, the representative database 110d, and the scheduling database 110f are conventional databases known in the art. In an embodiment, the party database 110b, the representative database 110d, and the scheduling database 110f may be located outside the provider 110 and still operably coupled to the provider 110, to the communication engine 110a, to the routing engine 110c, and to the scheduling engine 110e through, for example, the network 105, described above with reference to FIG. 1a. In an embodiment, the party database 110b, the representative database 110d, and the scheduling database 110f include a plurality of databases. In an embodiment, the provider 110 is a membership organization and the party database 110b includes a variety of previously collected information on members of the membership organization. In an embodiment, the party database 110b, the representative database 110d, and the scheduling database 110f are publicly available databases. In an embodiment, the party database 110b, the representative database 110d, and the scheduling database 110f are private databases which are available to be accessed by the provider 110.

Referring now to FIGS. 1a, 1b, 1c, 2a and 2d, a method 200 for providing customer service is illustrated. In the illustrated embodiments below, the system and method are described with reference to using a website communication to set up a phone communication with the provider 110. However, the system and method are not so limited and a variety of different communication methods known in the art are envisioned to be utilized to practice the method 200. Where appropriate, examples of alternative communication methods will be described. However, these examples are also not meant to be limiting, as one of skill in the art will recognize the many communication methods that fall into the scope of the present disclosure. The method 200 begins at step 202 where the party 115 desires more information from the provider 110. An information webpage 202a is provided by the provider 110 and includes a plurality of products and/or services listings such as, for example, a banking product and/or service 202aa, an insurance product and/or service 202ab, an investment product and/or service 202ac, a financial planning product and/or service 202ad, and a technical support product and/or service 202ae. The products and/or services illustrated are merely examples as the information website 202a is capable of including any product and/or service offered by any product and/or service provider. The banking product and/or service 202aa includes a contact number 202aaa and a call schedule link 202aab. The insurance product and/or service 202ab includes a contact number 202aba and a call schedule link 202abb. The investment product and/or service 202ac includes a contact number 202aca and a call schedule link 202acb. The financial planning product and/or service 202ad includes a contact number 202ada and a call schedule link 202adb. The technical support product and/or service 202ae includes a contact number 202aea and a call schedule link 202aeb. In an embodiment, the party 115 may access the information website 202a when the party desires more information about a product and/or service offered by the provider. In an embodiment, the party 115 may access the information website 202a when the party has purchased a product and/or service offered by the provider and would like information related to, for example, support for the product and/or service. In an embodiment, the party 115 may provide party verification information to the provider 110 in order to access the information website 202a, and the communication engine 110a may take the verification information and check it against information in the party database 110b that has been previously collected on the party 115 to verify the identity of the party 115. In an embodiment, the provider 110 is a membership organization, the party 115 is a member of the membership organization, the information webpage 202a is part of a website offered by the membership organization, and party verification information includes a member name and a password that have been assigned to the party 115. In an alternative embodiment, the information webpage 202a may be replaced or supplemented by a product and/or services catalogue, a billboard, a television advertisement, a radio advertisement, and/or any other product and/or service advertising means known in the art, and the call schedule links 202aab, 202abb, 202acb, 202adb or 202aeb may include short message service (SMS) numbers, webpage addresses, email addresses, phone numbers, and/or a variety of other contact means known in the art.

Referring now to FIGS. 1a, 1b, 1c, 2a, 2d and 2e, the method 200 then proceeds to step 204 where the party 115 requests to communicate with the provider 110. The party 115 may select any of the call schedule links 202aab, 202abb, 202acb, 202adb or 202aeb for the banking product and/or service 202aa, the insurance product and/or service 202ab, the investment product and/or service 202ac, the financial planning product and/or service 202ad, or the technical support product and/or service 202ae, respectively, if the party 115 would like more information on or support for that product and/or service. Upon selection of any of the call schedule links 202aab, 202abb, 202acb, 202adb or 202aeb, the communication engine 110a saves a routing indicator in the party database 110b, the routing indicator including, for example, a product and/or service that the call schedule link is associated with (e.g. the call schedule link 202aab being associated with the banking product and/or service 202aa), information on the webpage that the call schedule link was selected from, and/or a variety of other information that can indicate what kind of information the party 115 may be looking for. In an embodiment, when the party 115 selects of one of the call schedule links 202aab, 202abb, 202acb, 202adb or 202aeb, the communication engine 110a will present the party 115 with a classification webpage 204a. The classification webpage 204a includes a classification prompt 204aa and a plurality of classification fields 204ab, 204ac and 204ad. In an embodiment, the classification fields 204ab, 204ac and 204ad are drop down menus that are linked such that the choice made by the party 115 for the classification field 204ab determines the available choices for the classification field 204ac, and the choice made by the party 115 for the classification field 204ac determines the available choices for the classification field 204ad. The party 115 then enters information in the classification fields 204ab, 204ac and 204ad that corresponds to the subject matter of the communication that the party 115 wishes to have with the provider 110. The party 115 then selects a submit button 204ae to send the information in the classification fields 204ab, 204ac and 204ad to the provider 110. In an embodiment, the classification webpage 204a may be omitted from the method 200. In an alternative embodiment, the request from the party 115 to communicate with the provider 110 may originate from the party 115 through, for example, a SMS such as a text message to a number included on, for example, a television advertisement, a billboard advertisement, a radio advertisement and/or a variety of other advertisement media known in the art.

Referring now to FIGS. 1a, 1b, 1c, 2a, 2d and 2e, the method 200 then proceeds to step 206 where it is determined whether a representative is available. In an embodiment, the provider 115 provides a communication center that includes a plurality of representatives for responding to requests for communications from the plurality of parties 115, 120 and 125. In an embodiment, the representative is a representative of the provider 110. In an embodiment, the provider 110 is a third party to a party 115 and a products and services provider and the representative may be a representative of the third party provider or a representative of the products and services provider. Upon selection of the submit button 204ae in step 204 of the method 200, the communication engine 110a sends the routing indicator saved in the party database 110b in step 204 of the method 200, the information in the classification fields 204ab, 204ac, and 204ad submitted in step 204 of the method 200, and any information from the party database 110b retrieved after the verification of the party 115 in step 202 of the method 200, to the routing engine 110c. The routing engine 110c takes that information and checks the representative database 110d to determine which representatives in the communication center are available and qualified to deal with that request for communication including the particular routing indicator and classifications. If the routing engine 110c determines there is a representative available, the method 200 proceeds to step 208 where the available representative is prevented from receiving inbound calls. The scheduling engine 110e receives the identity of the available representative from the routing engine 110c and enters that available representative in the scheduling database 110f, which results in the available representative not being able to receive any inbound calls, e.g. any calls to a phone line of the available representative that is dedicated to responding to requests for communication from parties.

Referring now to FIGS. 1a, 1b, 1c, 2a and 2f, the method 200 then proceeds to step 210 where the party 115 is provided with inbound call information. The routing engine 110c sends the name and phone number of the available representative to the communication engine 110a and the scheduling engine 110e sends a time period and a party identifier to the communication engine 110a and the communication engine presents the party 115 with a present inbound call webpage 210a. The present inbound call webpage 210a is presented to the party 115 when a representative is available either immediately or shortly after the party 115 either selects one of the call schedule links 202aab, 202abb, 202acb, 202adb or 202aeb in step 204 of the method 200 (if there is no classification webpage 204a used in the method 200) or after the party 115 selects the submit button 204ae on the classification webpage 204a in step 204 of the method 200. The present inbound call webpage 210a includes a representative name 210aa which may be, for example, the name of the available representative determined at decision block 206 of the method 200. The present inbound call webpage 210a also includes a representative phone number 210ab which may be, for example, the number to the phone line of the available representative that is dedicated to responding to requests for communication from parties. The present inbound call webpage 210a also includes a call time period 210ac which may be, for example, a time period in which the party 115 is to call the representative phone number 210ab to speak with the available representative. In an embodiment, the call time period 210ac includes a countdown timer that signifies how much longer the scheduling engine 110e will prevent the available representative from being able to receive any inbound calls. The present inbound call webpage 210a also includes a party identifier 210ad which may be, for example, a multiple character identification string that will allow the communication engine 110a and the routing engine 110c to connect the party 115 to the available representative if the party 115 calls the representative phone number 210ab within the call time period 210ac. In an embodiment, if the call time period 210ac has not expired, the party identifier 210ad is stored in a current queue in the scheduling database 110f. In an embodiment, if the call time period 210ac has expired, the party identifier 210ad is stored in an expired queue for a predetermined amount of time, and after the predetermined amount of time, the party identifier 210ad is erased from the scheduling database 110f. The present inbound call webpage 210a also includes a cancel call button 210ae which may be, for example, a graphical user interface (GUI) that the party 115 may select if they decide that they no longer with to communicate with the provider 110. In an embodiment, if the party 115 selects the cancel call button 210ae, the scheduling engine 110e allows the available representative to receive inbound calls, e.g. any calls to a phone line of the available representative that is dedicated to responding to requests for communication from parties. In an alternative embodiment, the information on the present inbound call webpage 210a may be presented to the party 115 through a SMS or text message, through an email, or through a variety of other alternative communications known in the art.

Referring now to FIGS. 1a, 1b, 1c, 2a, 2f and 2g, the method 200 then proceeds to step 212 where the party 115 makes an inbound call and provides the party identifier 210ad. The party 115 may use the representative phone number 210ab to call the available representative using a phone communication. Use of the representative phone number 210ab connects the party 115 to the communication engine 110a, and the communication engine 110a requests a party identifier from the party 115. The party 115 then provides the party identifier 210ad received in step 210 of the method 200 to the communication engine 110a. The method 220 then proceeds to decision block 214 where it is determined whether the party identifier is in a current queue. The scheduling engine 110e receives the party identifier 210ad from the communication engine 110a and checks the scheduling database 110f to determine whether the party identifier 210ad presented to the party 115 in step 210 of the method 200 is in the current queue. In an embodiment, the party identifier 210ad is in the current queue if the call time period 210ac has not expired. If the party identifier 210ad is in the current queue, the method 200 proceeds to step 216 where the party 115 is connected to the available representative. The communication engine 110a connects the party 115 to the available representative and provides a connected webpage 216a. The connected webpage 216a includes a thank you 216aa and a new call scheduler 216ab. The party 115 is now connected to the available representative and may communicate with that representative to ask questions about a product and/or service provided by the provider 110 or receive support for a product and/or service provided by the provider 110. In an embodiment, the party 115 may select the new call scheduler 216ab if the party 115 determines that they have another question about a product and/or service or desire support on an existing product and/or service. The method 200 will then return to step 204.

Referring now to FIGS. 1a, 1b, 1c, 2a, 2c and 2g, if at decision block 214 of the method 200 it is determined that the party identifier 210ad is not in the current queue, the method 200 proceeds to decision block 218 where it is determined whether the party identifier is in the expired queue. The scheduling engine 110e receives the party identifier 210ad from the communication engine 110a and checks the scheduling database 110f to determine whether the party identifier 210ad presented to the party 115 in step 210 of the method 200 is in the expired queue. In an embodiment, the party identifier 210ad is in the expired queue if the call time period 210ac has expired. If the party identifier 210ad is not in an expired queue, the method 200 proceeds to step 220 of the method 200 where the party 115 is placed in a next available representative queue. The party 115 then waits until the next available representative of the provider 110 is available to deal with the request for communication from the party 115. In an embodiment, the next available representative queue may be a queue where provider stores any party that calls the provider 110 but has not previously scheduled a call to the provider 110, or a party whose call time period has been expired for a predetermined amount of time such as, for example, 24 hours. If at decision block 218 it is determined that the party identifier 210ad is in the expired queue, the method 200 proceeds to decision block 222 where it is determined whether the available representative determined at decision block 206 of the method 200 is available. If that available representative is still available, the method 200 proceeds to step 224 where the party 115 is connected to the available representative. The communication engine 110a connects the party 115 to the available representative and provides a connected webpage 216a. The connected webpage 216a includes a thank you 216aa and a new call scheduler 216ab. The party 115 is now connected to the available representative and may communicate with that representative to ask questions about a product and/or service provided by the provider 110 or receive support for a product and/or service provided by the provider 110. In an embodiment, the party 115 may select the new call scheduler 216ab if the party 115 determines that they have another question about a product and/or service or desire support on an existing product and/or service. The method 200 will then return to step 204. If at decision block 222 it is determined that the available representative determined at decision block 206 of the method 200 is not available, the method 200 proceeds to step 226 where the party 115 is placed in a next available representative queue. The party 115 then waits until the next available representative of the provider 110 is available to deal with the request for communication from the party 115. In an embodiment, the next available representative queue is a queue where provider stores any party that calls the provider 110 but has not previously scheduled a call to the provider 110 or a party whose call time period has been expired for a predetermined amount of time such as, for example, 24 hours.

Referring now to FIGS. 1a, 1b, 1c, 2a, 2b and 2h, if at decision block 206 of the method 200 it is determined that the a representative is not available, the method 200 proceeds to decision block 228 where it is determined whether the party 115 would like to schedule a later call. If at decision block 228 it is determined that the party 115 does not want to schedule a later call, the method proceeds to step 230 where the method 200 ends. If at decision block 228 it is determined that the party 115 would like to schedule a later call, the communication engine 110a presents the party 115 with a schedule later call webpage 228a. The schedule later call webpage 228a includes a party call button 228aa and a provider call button 228ab. The party call button 228aa is operable to indicate that the party 115 would like to call the representative of the provider 110. The provider call button 228ab is operable to indicate that the party 115 would like the representative of the provider 110 to call the party 115.

Referring now to FIGS. 1a, 1b, 1c, 2a, 2b, 2h, 2i and 2j, the method 200 proceeds to decision block 232 where it is determined whether the party 115 wants to call a representative of the provider 110. The party 115 may select the party call button 228ab on the schedule call later webpage 228a to indicate that the party 115 wants to call a representative of the provider 110, and the method 200 then proceeds to step 234 where the party 115 is provided with later call information. In an embodiment, the routing engine 110c sends the name and phone number of an available representative to the communication engine 110a and the scheduling engine 110e sends a time period and a party identifier to the communication engine 110a and the communication engine 110a presents the party 115 with a later call webpage 234a that includes a representative name 234aa which may be, for example, the name of the available representative. The later call webpage 234a also includes a representative phone number 234ab which may be, for example, the number to the phone line of the available representative that is dedicated to responding to requests for communication from parties. The later call webpage 234a also includes a call time period field 234ac that is a future time period relative to the time that the party 115 selected the party call button 228ab on the schedule call later webpage 228a. The later call webpage 234a also includes a party identifier 234ad which may be, for example, a multiple character identification string that will allow the communication engine 110a and the routing engine 110c to connect the party 115 to the available representative if the party 115 calls the representative phone number 234ab within the call time period 234ac. In an embodiment, if the call time period 210ac has not expired, the party identifier 210ad is stored in a current queue in the scheduling database 110f. In an embodiment, if the call time period 210ac has expired, the party identifier 210ad is stored in an expired queue for a predetermined amount of time, and after the predetermined amount of time, the party identifier 210ad is erased from the scheduling database 110f. The method 200 then proceeds to step 236 where the party 115 is connected to the representative. During the call time period 234ac, the available representative is prevented from receiving inbound calls by the scheduling engine 110e, similar to step 208 of the method 200. The scheduling engine 110e receives the identity of the available representative from the routing engine 110c based on the call time period 234ac and enters that available representative in the scheduling database 110f, which results in the available representative not being able to receive any inbound calls during the call time period 234ac, e.g. any calls to a phone line of the available representative that is dedicated to responding to requests for communication from parties. The method 200 then proceeds to step 212 and follows the method 200 as described above.

In an alternative embodiment, the party 115 may select the party call button 228ab on the schedule call later webpage 228a to indicate that the party 115 wants to call a representative of the provider 110, and the method 200 then proceeds to step 234 where the party 115 is provided with later call information. The communication engine presents the party 115 with a later call webpage 234b that includes a call time period field 234ba. The party 115 enters a time period in the call time period field 234ba which the party 115 would like to call a representative of the provider 110. The scheduling engine 110e receives the time period provided by the party 115 in the call time period field 234ba and sends that time period to the scheduling engine 110e and the routing engine 110c. The routing engine 110c sends the name and phone number of an available representative to the communication engine 110a and the scheduling engine 110e sends a party identifier to the communication engine 110a and the communication engine presents the party 115 with a representative name 234bb which may be, for example, the name of the available representative, a representative phone number 234bc which may be, for example, the number to the phone line of the available representative that is dedicated to responding to requests for communication from parties, and a party identifier 234bd which may be, for example, a multiple character identification string that will allow the communication engine 110a and the routing engine 110c to connect the party 115 to the available representative if the party 115 calls the representative phone number 234bc within the call time period 234ba. In an embodiment, if the call time period 210ba has not expired, the party identifier 210bd is stored in a current queue in the scheduling database 110f. In an embodiment, if the call time period 210ba has expired, the party identifier 210bd is stored in an expired queue for a predetermined amount of time, and after the predetermined amount of time, the party identifier 210bd is erased from the scheduling database 110f. The method 200 then proceeds to step 236 where the party 115 is connected to the representative. During the call time period 234ba, the available representative is prevented from receiving inbound calls by the scheduling engine 110e, similar to step 208 of the method 200. The scheduling engine 110e receives the identity of the available representative from the routing engine 110c based on the call time period 234ba and enters that available representative in the scheduling database 110f, which results in the available representative not being able to receive any inbound calls during the call time period 234ba, e.g. any calls to a phone line of the available representative that is dedicated to responding to requests for communication from parties. The party 115 may then wait until the call time period 234ba to attempt to contact the representative. The method 200 then proceeds to step 212 and follows the method 200 as described above.

Referring now to FIGS. 1a, 1b, 1c, 2a, 2b, 2h and 2k, if at decision block 232 it is determined that the party 115 does not want to call a representative of the provider 110, the method 200 proceeds to decision block 238 where it is determined whether the party 115 wants a representative of the provider 110 to call the party 115. If the party does not want a representative of the provider 110 to call the party 115, the method 200 proceeds to step 230 where the method 200 ends. If the party 115 selects the provider call button 228ab on the schedule call later webpage 228a to indicate that the party 115 wants a representative of the provider 110 to call the party 115, the method 200 then proceeds to step 240 where the party 115 is provided with later call information. The communication engine presents the party 115 with a later call webpage 234c that includes a party number field 234ca and a call time period field 234cb. The party 115 enters a party number in party number field 234ca that a representative may call the party 115 at and a time period in the call time period field 234cb which the party 115 would like a representative of the provider 110 to call them. The scheduling engine 110e receives the party number and the time period provided by the party 115 and sends the party number and the time period to the scheduling engine 110e and the routing engine 110c. The routing engine 110c sends the name of an available representative to the communication engine 110a and the communication engine presents the party 115 with a representative name 234cc which may be, for example, the name of the available representative that will call them during the time period provided in the call time period field 234cb. The method 200 then proceeds to step 242 where the party 115 connected to the available representative. The communication engine 110a uses the party number to connect the available representative to the party 115. The party 115 is now connected to the available representative and may communicate with that representative to ask questions about a product and/or service provided by the provider 110 or receive support for a product and/or service provided by the provider 110. Thus, a system and method are provided which allow a party to schedule a call with a representative of a provider in order to prevent the party from waiting in a queue for the representative, thereby providing a better experience for the party relative to conventional methods.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer-readable medium comprising computer-readable instructions for providing customer service, said computer-readable instructions comprising instructions for:
   providing a communication center comprising a plurality of representatives;
   receiving a request for communication from a first party via a first webpage;
   determining an available representative from the plurality of representatives and a representative available time period for the request for communication;
   preventing a phone line of the available representative that is dedicated to responding to requests for communication from receiving any inbound calls from a second party during the representative available time period;
   providing the first party with communication information;
   connecting the first party to the available representative during the representative available time period; and
   providing a second webpage notifying the first party of the connection.

2. The computer-readable medium of claim 1, wherein the request for communication comprises a routing indicator that is operable to be used to determine the available representative.

3. The computer-readable medium of claim 1, further comprising computer-readable instructions comprising instructions for:
   communicating with the first party through the available representative.

4. The computer-readable medium of claim 1, further comprising computer-readable instructions comprising instructions for:
   accessing a party database comprising previously collected information about the first party, wherein the previously collected information is provided to the available representative.

5. The computer-readable medium of claim 1, wherein the communication information comprises a representative phone number, a call time period, and a first party identifier.

6. The computer-readable medium of claim 1, further comprising computer-readable instructions comprising instructions for:
  receiving a first party phone number from the first party.

7. A computer-readable medium comprising computer-readable instructions for providing customer service, said computer-readable instructions comprising instructions for:
  receiving a plurality of requests for communication via a first webpage, each request for communication coming from one of a plurality of first parties;
  determining an available representative and a representative available time period for each of the requests for communication;
  scheduling a communication for each of the plurality of requests for communication between the first party that submitted the request for communication and the available representative determined for that request for communication to occur during the representative available time period, wherein a phone line of the available representative that is dedicated to responding to requests for communication and determined for that request for communication is prevented from receiving any inbound calls;
  providing a second webpage notifying each of the first parties of the connection.

8. The computer-readable medium of claim 7, wherein at least one of the plurality of requests for communication comprises a routing indicator that is that is operable to be used to determine the available representative for that at least one of the plurality of requests.

9. The computer-readable medium of claim 7, further comprising computer-readable instructions comprising instructions for:
  providing the available representative determined for a particular request for communication with a first party verification information from the first party that submitted that request for communication.

10. The computer-readable medium of claim 7, wherein the communication information comprises a representative phone number, a call time period, and a first party identifier.

11. The computer-readable medium of claim 7, further comprising computer-readable instructions comprising instructions for:
  providing the available representative determined for a particular request for communication with a first party phone number from the first party that submitted that request for communication.

12. The computer-readable medium of claim 7, further comprising computer-readable instructions comprising instructions for:
  providing the available representative determined for a particular request for communication with a first party available time period from the first party that submitted that request for communication.

13. A computer-readable medium comprising computer-readable instructions for providing customer service, said computer-readable instructions comprising instructions for:
  sending a request for communication to a provider via a first webpage;
  receiving communication information from the provider, the communication information comprising a representative available time period;
  communicating with an available representative during the representative available time period;
  preventing a phone line of the available representative that is dedicated to responding to requests for communication from receiving any inbound calls during the communicating; and
  providing a second webpage notifying the first party of the connection.

14. The computer-readable medium of claim 13, wherein the request for communication comprises a routing indicator that the provider uses to determine the available representative and the respective available time period.

15. The computer-readable medium of claim 13, wherein the communication information comprises a representative phone number, a call time period and a first party identifier.

16. The computer-readable medium of claim 13, further comprising computer-readable instructions comprising instructions for:
  sending a first party phone number to the provider.

17. The computer-readable medium of claim 13, further comprising computer-readable instructions comprising instructions for:
  sending a first party available time period to the provider.

18. The computer-readable medium of claim 13, further comprising computer-readable instructions comprising instructions for:
  providing a first party verification information, wherein the first party verification information is used by the available representative to access information previously collected by the provider.

19. The computer-readable medium of claim 13, wherein the sending a request for communication comprises sending a request for communication using a website communication, and the communicating with an available representative comprises communicating with an available representative using a phone communication.

* * * * *